United States Patent [19]

Ishida

[11] 4,111,447
[45] Sep. 5, 1978

[54] FOLDING BICYCLE

[75] Inventor: Hajime Ishida, Tokyo, Japan

[73] Assignee: Tomy Kogyo Co., Ltd., Tokyo, Japan

[21] Appl. No.: 782,366

[22] Filed: Mar. 29, 1977

[51] Int. Cl.² .............................................. B62K 15/00
[52] U.S. Cl. .................................... 280/278; 280/261; 280/281 R
[58] Field of Search ................... 280/278, 287, 281 R, 280/261; 180/33 R

[56] References Cited

U.S. PATENT DOCUMENTS

| | | | |
|---|---|---|---|
| 3,354,975 | 11/1967 | Stuart | 280/278 X |
| 3,354,976 | 11/1967 | Camps | 280/287 X |
| 3,417,834 | 12/1968 | Smith | 280/287 X |
| 3,419,283 | 12/1968 | Newland | 280/281 X |
| 3,623,749 | 11/1971 | Jensen | 280/278 |
| 3,887,218 | 6/1975 | DiBlasi | 280/278 |
| 3,979,136 | 9/1976 | Lassiere | 280/278 |
| 3,990,717 | 11/1976 | Best | 280/278 |
| 4,026,573 | 5/1977 | Richardson | 280/278 |

Primary Examiner—Kenneth H. Betts
Attorney, Agent, or Firm—Toren, McGeady and Stanger

[57] ABSTRACT

This invention, which provides a folding bicycle, comprises a foldable frame structure including a front support assembly having handlebars and arranged to be rearwardly foldable. According to the invention, the user can very quickly and easily fold the bicycle by manually rearwardly folding the front support assembly which includes upper and lower sections interconnected by a hinge.

12 Claims, 13 Drawing Figures

FOLDING BICYCLE

BACKGROUND OF THE INVENTION

1. Field of the Invention

This invention relates to improvements in or relating to folding bicycles or the like.

2. Description of the Prior Art

There have heretofore been proposed many folding or collapsible bicycles. It is pointed out, in general, that most folding or collapsible structures of these bicycles are complicated and one cannot quickly and easily extend or fold such structures and that most of such bicycles cannot be folded into a very compact form. For example, one of these known bicycles is provided with a bicycle frame which is so constructed as to be capable of being extended and folded along its longitudinal axis and which has a handlebar stem and a seat pillar that are axially slidably mounted so as to be capable of being axially extended and folded. With such structure, in order to extend or fold the bicycle, it is necessary to extend or fold such foldable or collapsible parts, namely, the frame, the handlebar stem and the seat pillar, individually and it is difficult to quickly and easily extend and fold the bicycle, and moreover, the dimension of the folded bicycle is not much smaller than that of the extended bicycle.

In folding bicycles of this kind, there are two important requirements that bicycles should be able to be very quickly and easily extended and folded and that they should be capable of being folded into the most compact form possible so that they can be easily carried and stowed in a room for storage.

SUMMARY OF THE INVENTION

The present invention is intended to remove such drawbacks or disadvantages indicated with such known bicycles and to meet the above requirements and other requirements of structural simplification and mechanical strength.

According to the invention, there is provided a folding bicycle which comprises a rearwardly foldable front support assembly comprising pivotally interconnected upper and lower assembly sections, said upper assembly section having handlebars, said lower assembly section having fork blades to support a front wheel therebetween, a lower frame member pivotally attached at its front end to said lower assembly section and supported at its rear ends on a free-wheel hub axle of a rear wheel, an upper frame member pivotally attached at its front end to said upper assembly section and at its rear ends to the rear ends of said lower frame member or to said free-wheel hub axle for angular movement relative to said lower frame member, and a seat stay pivotally attached at a lower portion thereof to said lower frame member and slidably attached at an upper portion thereof to said upper frame member.

According to the structure of a bicycle stated above, one can very quickly and easily fold the bicycle with a very simple procedure that the rearwardly foldable front support assembly is rearwardly folded by manipulation, and the bicycle can be folded into a situation in which the pivotally interconnected upper and lower assembly sections, said upper frame member, said lower frame member, etc. lie substantially parallel, thus making it possible to fold the bicycle into a very small form which may be colloquially described as a bundle of bicycle-constituting members. In this case, a cross-sectional area of the folded bicycle is not much larger than that of the total of the cross-sectional areas of such constituting members.

The bicycle in accordance with the present invention is adapted to be held extended by the weight of the user riding it. To ensure safety for users, however, a locking device is preferably attached to a pivotal joint which interconnects the upper and lower assembly sections of said front support assembly so that accidental or unexpected folding of the bicycle in use can be prevented by firmly locking said upper and lower assembly sections extended.

BRIEF DESCRIPTION OF THE DRAWINGS

The invention will now be further described by way of example only, with reference to the accompanying drawings, in which.

DESCRIPTION OF THE PREFERRED EMBODIMENT

Figure 1:
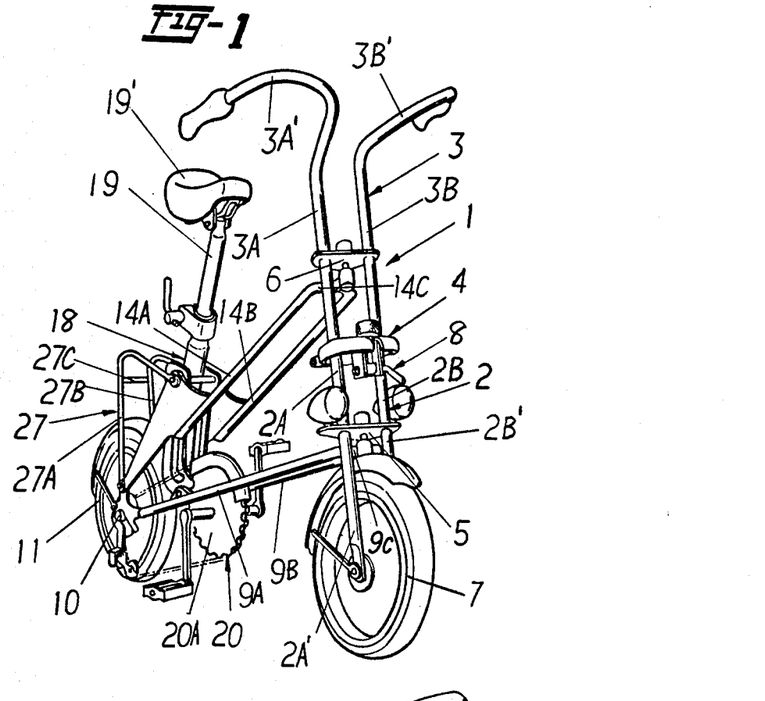
FIG. 1 is a perspective view of one form of the bicycle extended.

Indicated by reference numeral 1 is a front support assembly which is so constructed as to be rearwardly foldable. The assembly 1 comprises a downwardly extending lower assembly section 2 and an upwardly extending upper assembly section 3 which are pivotally interconnected by means of a hinge 4. Each of the lower and upper assembly sections 2, 3 is in the form of a doubletubular frame and comprises two tubular members 2A, 2B, 3A, 3B which are fixed in laterally spaced relationship by a spacer means 5, 6 which is secured to their intermediate portions, as shown in FIG. 1. The two lower tubular members 2A, 2B extend downwardly to form fork blades 2A', 2B' which support a front wheel 7 therebetween. On the other hand, the two upper tubular members 3A, 3B extend upwardly and are bent to form handlebars 3A', 3B'.

Figure 9:
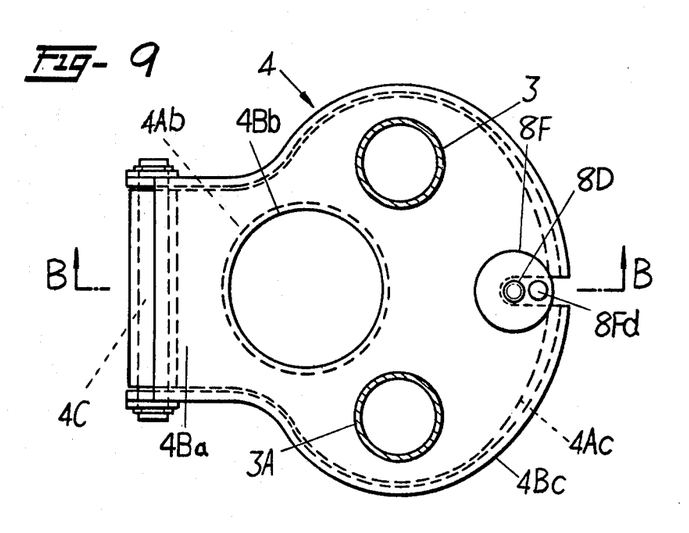
FIG. 9 is an enlarged plan view of a hinge interconnecting the upper and lower assembly sections forming the rearwardly foldable front support assembly.
Figure 10:
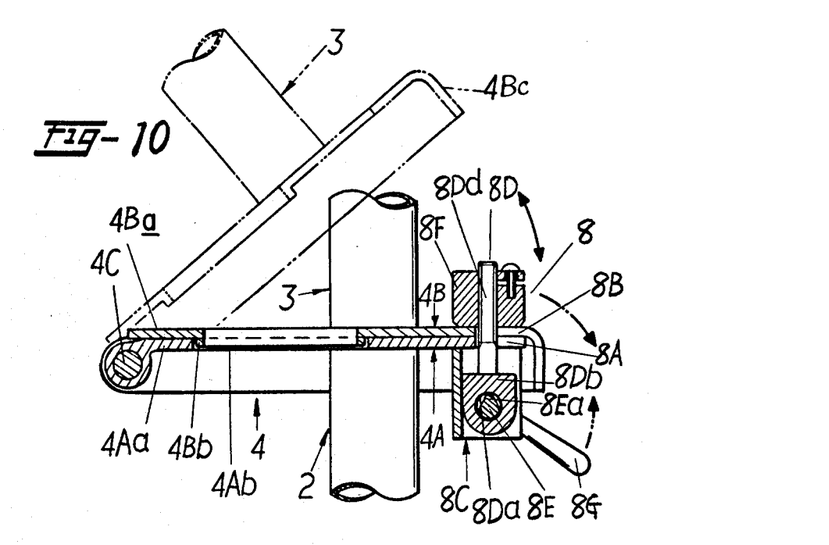
FIG. 10 is a cross-sectional side view of the hinge, taken along B—B line of FIG. 9.

As clearly shown in FIGS. 9 and 10, the hinge 4 comprises a flat lower hinge member 4A and a generally inverted cup-like upper hinge member 4B. The lower hinge member 4A is fixedly mounted on upper ends of the two tubular members 2A, 2B, of said lower assembly section 2, and the upper hinge member 4B is fixedly attached to lower ends of the two tubular members 3A, 3B of said upper assembly section 3. The lower and upper hinge members 4A, 4B are generally circular in plan view and have rearwardly extending portions 4A*a*, 4B*a*, respectively which are interconnected at their rear ends by a pin 4C extending transversely thereof.

The upper hinge member 4B is formed with a downwardly projecting ring 4B*b* which is adapted to be brought into fitted engagement with a circular aperture 4A*b* formed in the lower hinge member 4A. Also, the upper hinge member 4B is provided with a dependent peripheral wall 4B*c* so that when it is in a closed position, a peripheral edge 4A*c* of the lower hinge member 4A is surrounded with the peripheral wall 4B*c* in loosely contacted relationship. Therefore, the upper hinge member 4B as a whole is adapted to be brought into fitted engagement with the lower hinge member 4A when the former is loaded.

Figure 11:
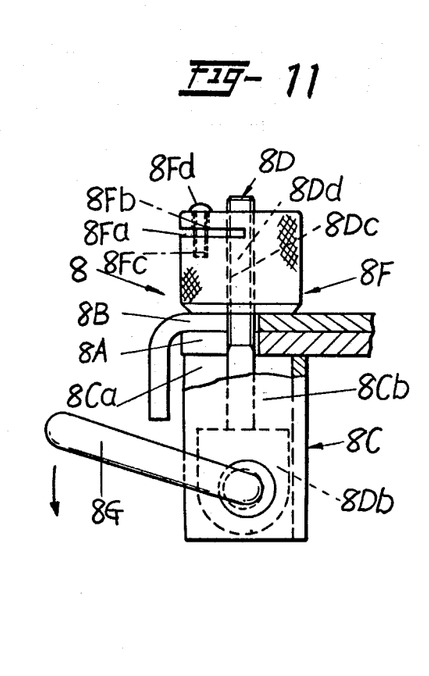
FIG. 11 is a partially cut-out and cross-sectioned side view, in an enlarged scale, of a locking device shown in FIGS. 9 and 10.

For greater security, the hinge 4 is preferably provided with a locking device 8. In the illustrated embodiment, the locking device 8 is of a quick-release type and comprises rearwardly extending cut-outs 8A, 8B formed in the lower and upper hinge members 4A, 4B at their front ends so as to communicate with each other, a bracket 8C depending from a front portion of the lower hinge member 4A, said bracket 8C having side walls 8C*a*, 8C*b* and having its front side opened, a locking arm 8D vertically swingably supported on a shaft 8E, which is rotatably carried by said side walls 8C*a*, 8C*b* and which passes transversely through a cylindrical bore 8D*a* formed in a block-like base portion 8D*b* of said locking arm 8D, so that when the arm 8D is downwardly swung, it can be engaged in said cut-outs 8A, 8B, said shaft 8E also having at its intermediate portion a radially outwardly projecting portion 8E*a* which serves as a cam to axially displace said locking arm 8D, a nut 8F engaged with threaded part 8D*c* formed in the peripheral surface of a rod portion 8D*d* of said locking arm 8D, and a handle lever 8G fixed to one end of said shaft 8E so that the shaft 8E can be rotated by manipulation of the handle lever 8G.

The nut 8F is formed, at a portion adjacent to the top surface thereof, with a horizontally extending substantially semi-circular slit 8F*a* and has vertically aligned threaded bores 8F*b*, 8F*c* with which a lock screw 8F*d* engages, respectively.

A substantially U-shaped lower frame member 9, which comprises two rearwardly extending forks 9A, 9B and a connection 9C connecting together the forks 9A, 9B, is pivotally attached at its front end to said lower assembly section 2 and is supported at its rear ends on a free-wheel hub axle 10 of a rear wheel 11. More specifically, the lower frame member 9 is provided, at the front connection 9C of rearwardly extending forks 9A, 9B, with a pair of forwardly projecting joint portions 9D*a*, 9D*b* and is connected at the joint portions 9D*a*, 9D*b* by a horizontal pivot pin 12 to a bracket 13 depending from an intermediate portion of the spacer means 5 of the two lower tubular members 2A, 2B, and the forks 9A, 9B are supported on said axle 10 at their rear ends 9E*a*, 9E*b* which are enlarged and formed into planar mounting portions, respectively.

Similarly, a substantially U-shaped upper frame member 14, which comprises two rearwardly extending forks 14A, 14B and a connection 14C connecting together these forks, is pivotally attached at its front end and rear ends to said upper assembly section 3 and the rear ends 9E*a*, 9E*b* of the forks 9A, 9B of said lower frame member 9, respectively. More specifically, the upper frame member 14 has, at the front connection 14C of forks 14A, 14B, a pair of forwardly projecting joint portions 14D*a*, 14D*b* and is connected at the joint portions 14D*a*, 14D*b* by a horizontal pivot pin 15 to a bracket 16 depending from an intermediate portion of the spacer means 6 of the two upper tubular members 3A, 3B, and the forks 14A, 14B are connected by pivot pins 17*a*, 17*b* to the rear ends 9E*a*, 9E*b* of forks 9A, 9B of said lower frame member 9 at their rear ends 14E*a*, 14E*b*, which are rear extremities of generally triangularly shaped planar mounting portions 14F*a*, 14F*b* of the forks 14A, 14B, respectively. It is to be noted, however, that the rear ends 14E*a*, 14E*b* of forks 14A, 14B may be pivotally attached to said hub axle 10.

A seat stay 18 which slidably supports a seat pillar 19 with a saddle 19' at its upper end and rotatably supports a chain wheel assembly 20 at its lower end is pivotally attached to the lower frame member 9 at its lower portion near to the chain wheel assembly 20 by a transversely extending pivot shaft 21 supported by bearings 22A, 22B secured to the forks 9A, 9B of said lower frame member 9.

Figure 7:
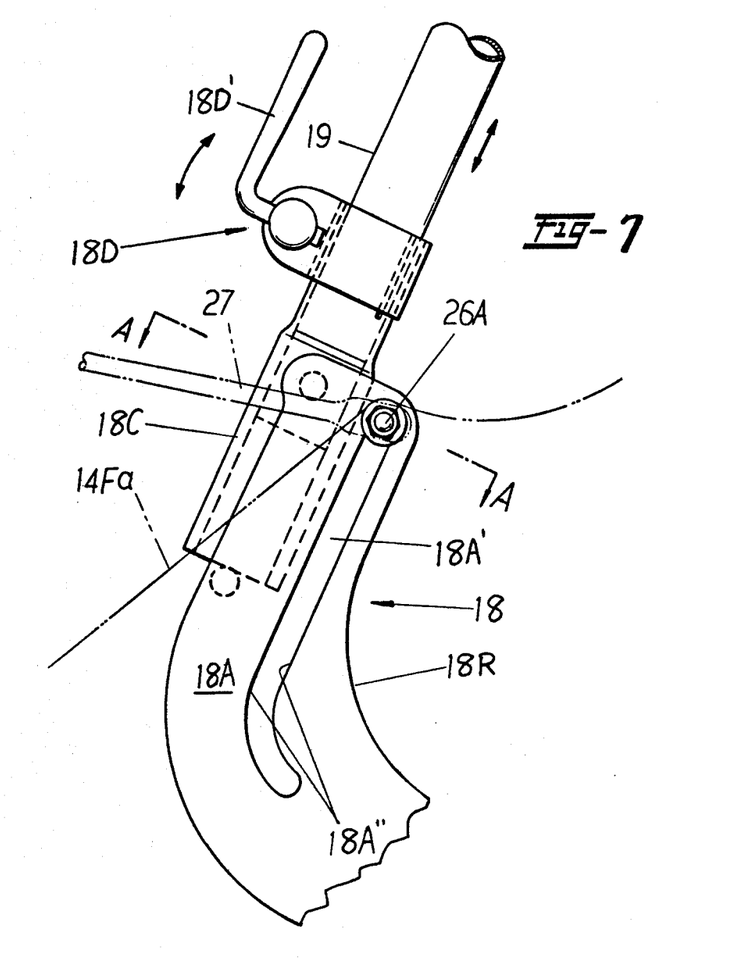
FIG. 7 is a partly broken-away side view, in an enlarged scale, of the seat stay to which the seat pillar is slidably attached.

The seat stay 18 comprises a pair of transversely spaced side plates 18A, 18B each being generally L-shaped in side view and having therein an elongated opening 18A', 18B' which extends downwardly from a portion adjacent to an upper end of the side plate to a bent portion 18R thereof and has its lower portion forwardly curved, a tubular support 18C secured to the side plates 18A, 18B between them at upper portions thereof and adapted to slidably receive the seat pillar 19, and a locking means 18D attached to the tubular support 18C for releasably locking the seat pillar 19. This locking means 18D includes a handle lever 18D' and is arranged such that when the lever 18D' is rotated clockwise or counterclockwise, the seat pillar 19 can be quickly locked or released.

Figure 8:
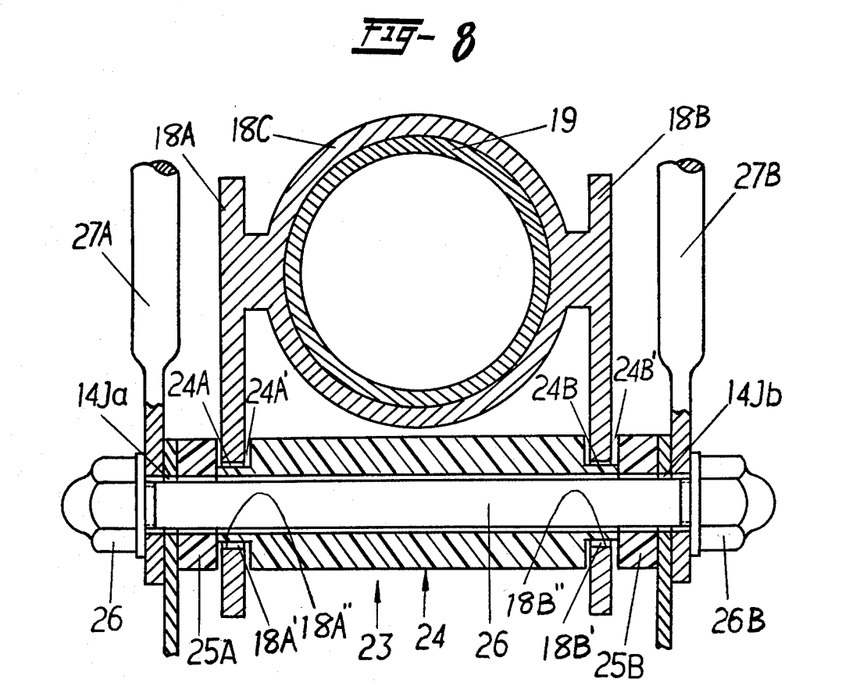
FIG. 8 is a partially cross-sectional view, in an enlarged scale, taken along A—A line of FIG. 7.

The seat stay 18 which is pivoted at its lower portion to said lower frame member 9 is slidably attached at its upper portion to the upper frame member 14 for pivotal movement relative to the latter. More specifically, the seat stay 18 is slidably supported by the member 14 through the medium of a positive motion cam 23 which is securely fixed to the mounting portions 14F*a*, 14F*b* of the member 14 therebetween and which extends transversely through the elongated openings 18A', 18B' of the side plates 18A, 18B of seat stay 18.

In the illustrated embodiment, the positive motion cam 23 comprises a cylindrical inner spacer 24 and two annular outer spacers 25A, 25B which are formed of plastics material, such as thermo-setting synthetic resin, respectively. These spacers are coaxially mounted on a stay bolt 26 which extends transversely across said mounting portions 14F*a*, 14F*b* through circular openings 14J*a*, 14J*b* formed therein. Of these spacers, the cylindrical inner spacer 24 has at its ends axially projecting annular steps 24A, 24B which form in cooperation with the annular outer spacers 25A, 25B annular grooves 24A', 24B' are recesses, respectively in which edges 18A", 18B" of each of the elongated openings 18A', 18B' are engaged, so that when the upper frame member 14 is swung, the seat stay 18 is driven to rotate about its pivotal axis by the positive motion cam 23 moving along the elongated openings 18A', 18B'.

Indicated by reference numeral 27 is a luggage-carrier which comprises two bars 27A, 27B each being bent to generally V-formation and a bridge 27C connecting these bars together. These bars are attached at one ends to the threaded ends of said stay bolt 26, which project outwardly through said circular openings 14Ja, 14Jb, by means of nuts 26A, 26B engaging said threaded ends and at the other ends to said pivot pins 17a, 17b so that the carrier 27 can be rotated on such pins when the bicycle is extended and folded.

Figure 12:
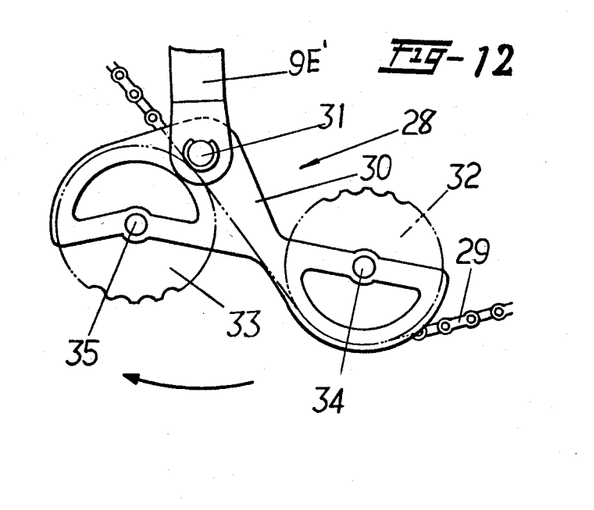
FIG. 12 is a schematic side view of an assembly for tensioning a chain.
Figure 13:
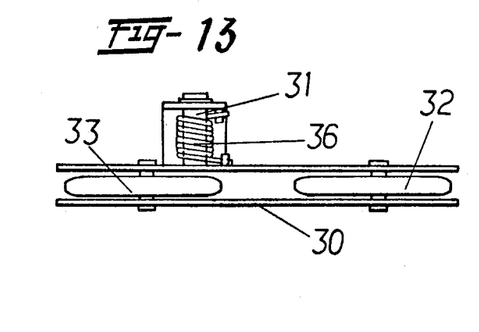
FIG. 13 is a schematic bottom view of the assembly shown in FIG. 12.

Reference numeral 28 indicates a tension wheel assembly for a chain 29 which comprises a bracket 30 pivotally mounted on the rear end 9Ea of said lower frame member 9 at a downwardly extending portion 9E' thereof by means of a pin 31, relatively small front and rear sprocket wheels 32, 33 which are rotatably supported on shafts 34, 35 attached to said bracket 30, respectively and a spring 34 mounted on said pin 31 so as to normally urge said bracket 30 to be rotated clockwise on said pin 31 (FIG. 12). When the bicycle is extended, the chain 29 is passed around a chain wheel 20A of said chain wheel assembly 20, a rear hub sprocket 37 and the front sprocket wheel 32.

Figure 2:
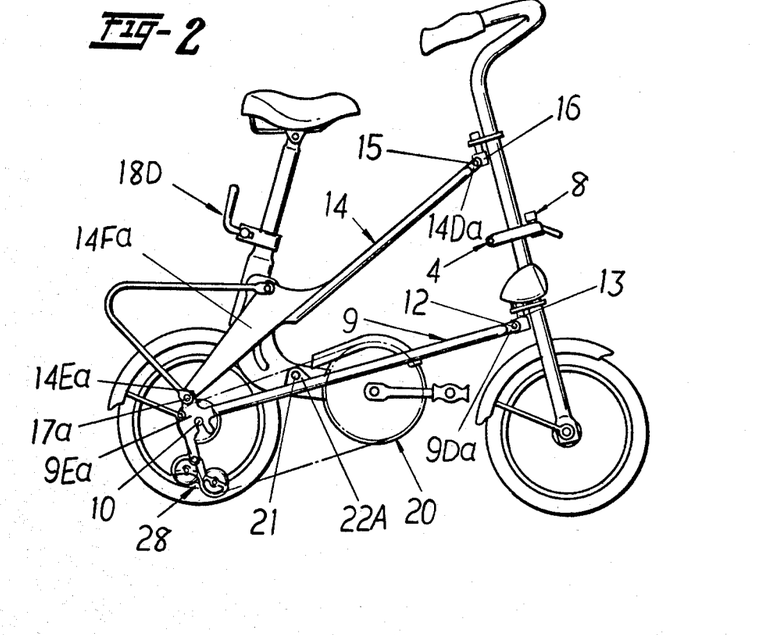
FIG. 2 is a side view of the bicycle shown in FIG. 1.
Figure 5:
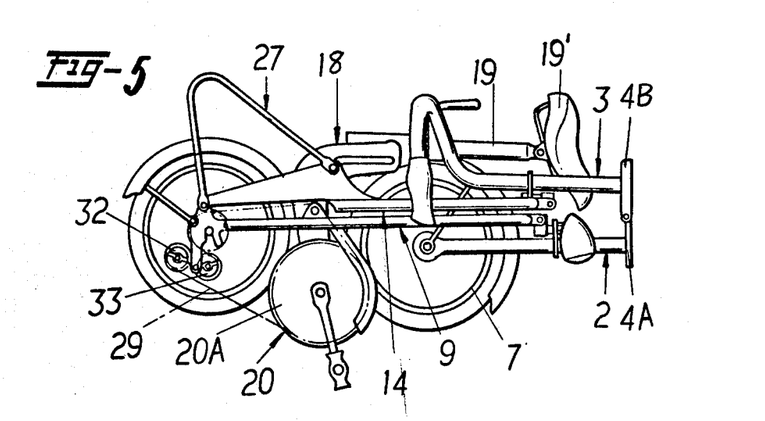
FIG. 5 is a side view of the bicycle in its fully folded state.

When it is desired to fold the bicycle from the condition of FIGS. 1 and 2 to that of FIG. 5, the user slightly rotates the handle lever 8G upwardly to axially upwardly slide the locking arm 8D which tightly fastens the lower and upper hinge members 4A, 4B together in cooperation with the nut 8F which is in threaded engagement therewith and in contact with the upper hinge member 4B from above. This action releases the nut 8F from the upper hinge member 4B and enables the locking arm 8D to be swung downwardly about the axis of the shaft 8E. Thus, when the locking arm 8D is manually swung downwardly, the upper hinge member 4B is placed in its state of being capable of being disengaged from the lower hinge member 4A and moved angularly relative thereto about the axis of the pin 4C of hinge 4.

Figure 3:
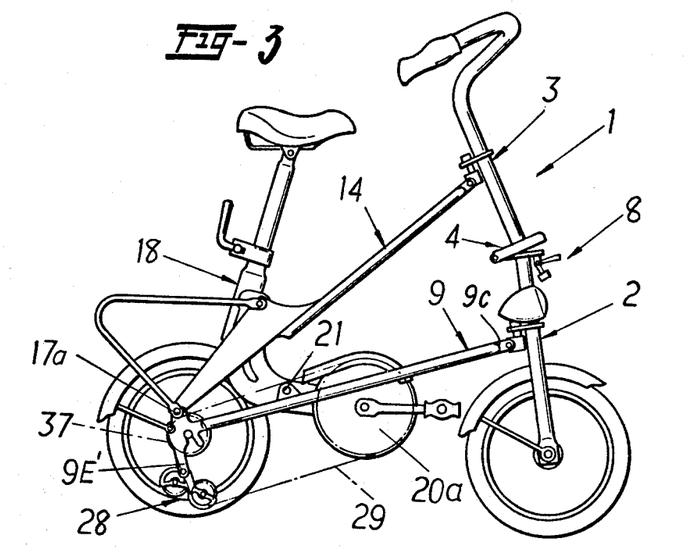
FIG. 3 is a side view of the bicycle, illustrating the state in which the front support assembly is slightly rearwardly folded.

Under such condition, when the upper assembly section 3 of the front support assembly 1 is rearwardly pushed or pulled, it is rotated rearwardly on the pin 4C of hinge 4, whereby the lower and upper sections 2, 3 of said assembly start folding as shown in FIG. 3.

Figure 4:
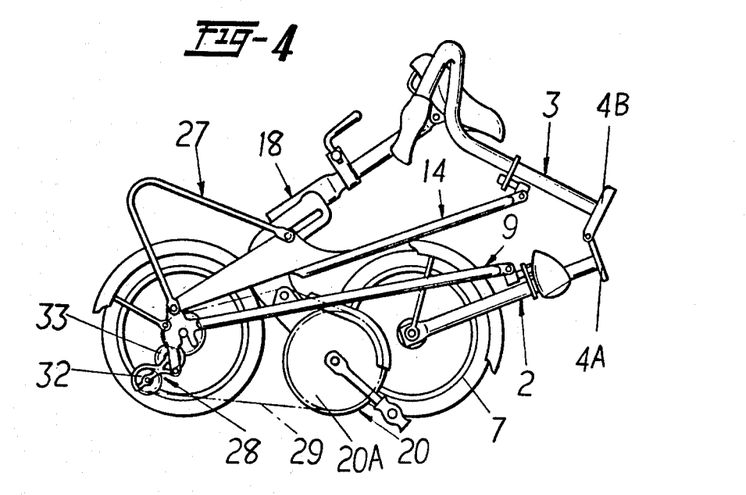
FIG. 4 is a side view of the bicycle partially folded.

Continuing this folding action, the lower and upper frame members 9, 14 and the seat stay 18 are caused to be folded in operative connection with the folding of the front support assembly 1, as shown in FIG. 4 which illustrates the bicycle partially folded. Continuing folding further beyond the condition of FIG. 4, the bicycle as a whole is completely folded into the condition shown in FIG. 5.

More detailed description will now be made regarding the folding process of the embodiment of the invention.

As shown in FIGS. 1 and 2, when the bicycle is in the extended condition, an intermediate portion of the front support assembly 1 and the lower and upper frame members 9 and 14 form a substantially triangular formation of which two sides correspond to the two frame members 9, 14 and the third side corresponds to the intermediate portion of the assembly 1, and the seat stay 18 is kept erected by being supported by the cam 23 located at and engaged with the upper ends of the elongated openings 18A', 18B' in the side plates 18A, 18B of seat stay 18. In this instance, the seat stay 18 is held erected in the state in which its upper portion is slightly forwardly inclined with respect to the vertical.

As the folding of the front support assembly 1 proceeds, the upper frame member 14 is rotated, in operative connection therewith, clockwise on pivot pins 17a, 17b in FIGS. 3 and 4, causing the seat stay 18 to be rotated on the pivot 21 in the same direction through the medium of the positive motion cam 23, and as the cam 23 is moved downwardly along said elongated openings 18A', 18B' and assumes an intermediate position therein, such as shown in FIG. 4, the bicycle is partially folded as illustrated therein. As may be seen from FIG. 4, in this partially folded condition the lower and upper assembly sections 2 and 3 are rearwardly folded into substantially V-shape, and a portion of the front wheel 7 which is moved rearwardly toward the rear wheel 11 is positioned between the two tubular members 9A, 9B of lower frame member 9, and also, the chain 29 passed around chain wheel 20A, rear hub sprocket 37 and front sprocket wheel 32 of tension wheel assembly 28 (see FIG. 12) is brought into engagement also with rear sprocket wheel 30 of the assembly 28 so as to be prevented from being loosened and disengaged from these wheels 20A, 37, 32 when the chain wheel assembly 20 is moved rearwardly toward the rear hub sprocket 37 with the lower portion of the seat stay 18, since as the chain wheel assembly 20 is moved rearwardly, the bracket 30 of tension wheel assembly 28 is caused to be rotated clockwise by the action of the spring 36 whereby the front and rear sprocket wheels 32, 33 are rearwardly and forwardly displaced, respectively, thus causing the chain 29 to be brought into engagement also with the rear sprocket wheel 33 and to be kept tensioned.

Figure 6:
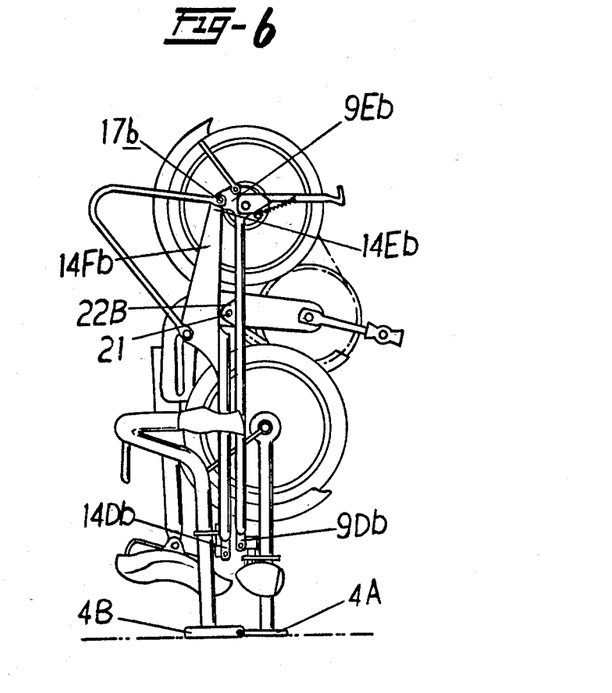
FIG. 6 is an opposite side view similar to FIG. 5, illustrating the state in which the folded bicycle is placed on a supporting surface in an upright position.

Then, as the folding action is further continued until the lower and upper assembly sections 2, 3 are angularly moved relative to each other for about 180°, these sections 2, 3 and the lower and upper frame members 9, 14 become substantially parallel with each other and at the same time the cam 23 reaches the lower ends of said elongated openings 18A', 18B', causing the upper half of the L-shaped or elbow-like seat stay 18 and accordingly the seat pillar 19 with saddle 19' to lie substantially parallel with the foregoing members 2, 3, 9, 14, and the luggagecarrier 27 is also rotated with the upper frame member 14, whereby the bicycle as a whole is completely folded into the condition of FIG. 5. In this folded condition, a portion of the front wheel 7 is positioned between the two tubular members 9A, 9B, 14A, 14B of each of the lower and upper frame members 9, 14 and a front portion of the saddle 19' between the two tubular members 3A, 3B of said upper assembly section 3. The bicycle thus folded may be placed on a supporting surface, such as a floor in an upright position on the flat hinge members 4A, 4B, as shown in FIG. 6.

It will be self-evident from the preceding description that in order to unfold the folded bicycle from the condition of FIG. 5 to that of FIG. 1 or 2, the user has only to manually unfold the folded front support assembly 1 and that unfolding of this assembly 1 will cause all the other component members folded to be unfolded.

What is claimed is:

1. A folding bicycle comprising a rearwardly foldable front support assembly comprising pivotally interconnected upper and lower assembly sections, said upper assembly section having handlebars, said lower assembly section having fork blades to support a front wheel therebetween, a lower frame member pivotally attached at its front end to said lower assembly section and supported at its rear ends on a freewheel hub axle of a rear wheel, an upper frame member pivotally attached at its front end to said upper assembly section and at its rear ends to the rear ends of said lower frame member or to said free-wheel hub axle for angular movement relative to said lower frame member, and a seat stay pivotally attached at a lower portion thereof to said lower frame member and slidably attached at an upper portion thereof to said upper frame member.

2. A folding bicycle as set forth in claim 1, wherein each of the upper and lower assembly sections takes the form of a frame which comprises two tubular members held in laterally spaced relationship by a spacer means which is secured to their intermediate portions, the two tubular members of said upper assembly section being bent at their upper portions to form handlebars, the portions of the two tubular members of said lower assembly section extending downwardly from the spacer means forming the fork blades.

3. A folding bicycle as set forth in claim 2, wherein the upper and lower sections of said rearwardly foldable front support assembly are pivotally connected together for relative angular movement by means of a hinge.

4. A folding bicycle as set forth in claim 3, wherein said hinge comprises a flat lower hinge member fixedly mounted on upper ends of the two tubular members of said lower assembly section and an inverted cup-like upper hinge member fixedly attached to lower ends of the two tubular members of said upper assembly section and adapted to be brought into fitted engagement with said flat lower hinge member when said upper hinge member is loaded, said lower and upper hinge members having rearwardly extending portions and interconnected by a pin at their rear ends.

5. A folding bicycle as set forth in claim 3, wherein said hinge is provided with a locking device.

6. A folding bicycle as set forth in claim 4, wherein said hinge is provided with a locking device of a quick release type, said locking device comprising a rearwardly extending cut-out formed in said upper hinge member at a front end thereof, a bracket secured to and depending from a front portion of said lower hinge member, a fastening member swingably attached to said bracket and adapted to be releasably engaged with said rearwardly extending cut-out to fasten said upper and lower hinge members.

7. A folding bicycle as set forth in claim 1, wherein each of said lower and upper frame members is formed into substantially U-shape and comprises two rearwardly extending forks and a connection connecting these forks together, the forks of said upper frame member having at its rear ends planar mounting portions terminating in rear extremities.

8. A folding bicycle as set forth in claim 1, wherein said seat stay comprises a pair of transversely spaced side plates each being generally L-shaped in side view and having therein an elongated opening, a tubular support secured to the side plates between them at upper portions thereof and adapted to slidably receive a seat pillar, and a locking means attached to the tubular support for releasably locking the seat pillar.

9. A folding bicycle as set forth in claim 8, wherein said seat stay is slidably supported by said upper frame member through the medium of a positive motion cam securely fixed to the mounting portions of said upper frame member therebetween and extending transversely through the elongated openings of said side plates.

10. A folding bicycle as set forth in claim 9, wherein said positive motion cam comprises a cylindrical inner spacer and two annular outer spacers which are formed of plastics material, said spacers being coaxially mounted on a stay bolt which extends transversely across said mounting portions through openings formed therein, and a pair of annular grooves in which edges of said elongated openings are slidably engaged.

11. A folding bicycle as set forth in claim 1, wherein a tension wheel assembly for a chain is provided which comprises a bracket pivotally mounted on a rear end of said lower frame member by means of a pin, relatively small front and rear sprocket wheels rotatably supported on shafts attached to said bracket, respectively and a spring mounted on said pin so as to urge said bracket to be rotated in one direction on said pin.

12. A folding bicycle comprising a rearwardly foldable front support assembly comprising upper and lower assembly sections pivotally interconnected by means of a hinge, means attached to said hinge for releasably locking it, said upper assembly section comprising two tubular members extending upwardly and bent to form handlebars, said lower assembly section comprising two tubular members extending downwardly to form fork blades for supporting a front wheel therebetween, lower and upper frame members each comprising two rearwardly extending forks and a connection connecting the forks together, said lower frame member being pivotally attached at a front end thereof to said lower assembly section and supported at rear ends thereof on both ends of a free-wheel hub axle of a rear wheel, respectively, said upper frame member being pivotally attached at a front end thereof to said upper assembly section and at rear ends thereof to the rear ends of said lower frame member or to the both ends of said free-wheel hub axle, respectively for angular movement relative to said lower frame member, and a seat stay pivotally attached at a lower portion thereof to said lower frame member and slidably supported at an upper portion thereof on said upper frame member through the medium of a positive motion cam secured thereto so that when said upper frame member is rotated, said seat stay is caused to be rotated therewith, said seat stay having at its upper end means for releasably locking a seat pillar slidably supported thereby and said seat stay rotatably supporting at its lower end a chain wheel assembly.

* * * * *